United States Patent [19]

Pohlmann et al.

[11] Patent Number: 4,890,075
[45] Date of Patent: Dec. 26, 1989

[54] OPTICAL RADIATION LIMITER

[75] Inventors: Juergen L. W. Pohlmann, Alexandria, Va.; Richard C. Honey, San Mateo; John L. Guagliardo, Palo Alto, both of Calif.

[73] Assignee: The United States of America as represented by the Secretary of the Army, Washington, D.C.

[21] Appl. No.: 901,080

[22] Filed: Jul. 31, 1986

[51] Int. Cl.$^4$ .................................................. G02F 1/01
[52] U.S. Cl. ........................................ 330/4.3; 350/312
[58] Field of Search ............... 332/7.51; 350/312, 353, 350/267

[56] References Cited

U.S. PATENT DOCUMENTS

| 3,458,249 | 7/1969 | George | 332/7.51 |
| 3,614,211 | 10/1971 | Letter | 350/374 |
| 4,407,565 | 10/1983 | Saxe | 252/583 |
| 4,484,195 | 11/1984 | Shaffer | 252/205 |
| 4,536,061 | 8/1985 | Nishimura | 350/354 |
| 4,622,174 | 11/1986 | McKay et al. | 252/582 |
| 4,632,517 | 12/1986 | Asher | 350/362 |

OTHER PUBLICATIONS

Aviation Week & Spacetechnology, 8/30/65, "Radiation Goggles, Laser Defense Digest".

Primary Examiner—Nelson Moskowitz
Attorney, Agent, or Firm—Max L. Harwell; Aubrey J. Dunn; Anthony T. Lane

[57] ABSTRACT

A nonlinear optical fluid with radiation-absorbing small particles uniformly suspended in the fluid. For radiation below a threshold value, radiation passes through with slight attenuation. Above the threshold, only a limited level of radiation is passed, the limit being below the damage level of a sensitive optical detector.

3 Claims, 1 Drawing Sheet

OPTICAL RADIATION LIMITER

The invention described herein may be manufactured, used, and licensed by the U.S. Government for governmental purposes without the payment of any royalties thereon.

BACKGROUND OF THE INVENTION

This invention is in the field of devices for protecting optical detectors against high-intensity optical radiation. Many such devices are known, and include such things as mechanical and electroptical shutters, various types of filters, and lately, nonlinear optical materials which absorb, scatter, or reflect (or all three) incident radiation above some threshold value. While all of these devices have certain advantages, they suffer from various disadvantages which make them impracticable or unusable for some types of threat radiations. With the advent of high-power pulsed lasers, mechanical shutters, because of their slow operation times with respect to the rise time of a laser pulse, are unacceptable protection devices. Moreover, such shutters are complex in that they, along with electro-optical shutters, require radiation sensing and shutter operation circuits, i.e., the shutters are active rather than passive. Although passive devices such as interference filters are inherently instantaneous, they are restricted to particular wavelengths or restricted wavebands and are sensitive to incident radiation angle. Nonlinear optical materials may be both fast-acting and wideband, but often have threshold levels too high to prevent damage to sensitive optical detectors. The instant invention overcomes these disadvantages; it is fast-acting, wideband, insensitive to incident radiation angle, has a low enough threshold level to prevent damage to sensitive optical detectors, and is self-healing (which some prior art devices are not).

SUMMARY OF THE INVENTION

This invention is a device for protecting sensitive optical detectors from high-energy or high-power optical radiation, such as that provided by pulsed lasers. The device acts as an energy and/or power limiter to transmitted radiation and is a transparent cell with a nonlinear optical fluid therein, and with radiation absorbing particles essentially uniformly suspended in the fluid. Below a predetermined threshold level, the device is substantially transparent to incident radiation, but for radiation with an intensity above the level, the device limits the amount that it passes. The radiation not passed may be reflected, absorbed, scattered, or any combination of these phenomena.

DESCRIPTION OF PREFERRED EMBODIMENT OF THE INVENTION

Figure 1:
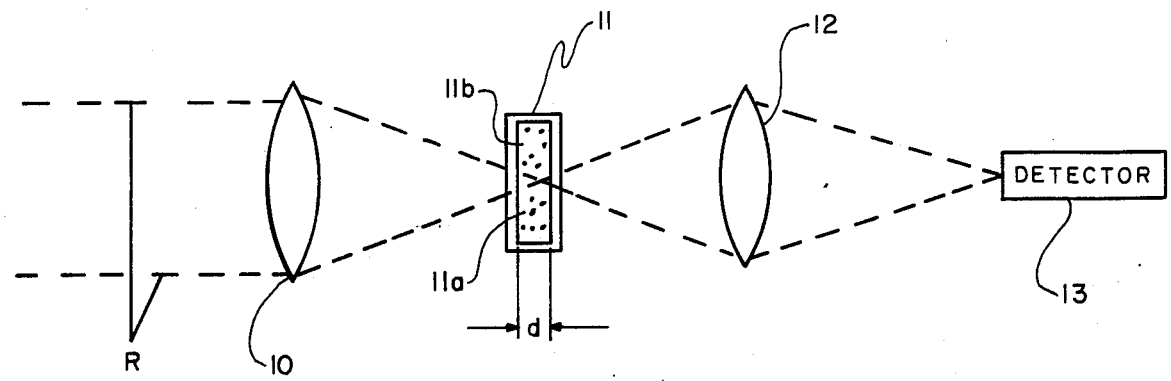
FIG. 1 is a schematic diagram of the inventive device in an optical system, in a nonlimiting mode.

The invention may be best understood when this description is taken in conjunction with the drawings. Referring to FIG. 1, which is a rather simple optical system used to illustrate operation of the invention, we see radiation R focused by a field or objective lens 10 into a limiting cell 11 made in accordance with the invention. This cell contains a nonlinear fluid 11a (preferably a liquid or gel to facilitate self-healing) of thickness d with radiation-absorbing particles 11b suspended therein. For radiation below a threshold level, most of the radiation passes through the cell (a small amount, say 10% or less, is absorbed). The transmitted radiation is focused by lens 12 onto detector 13, which may be the retina of the eye.

Figure 2:
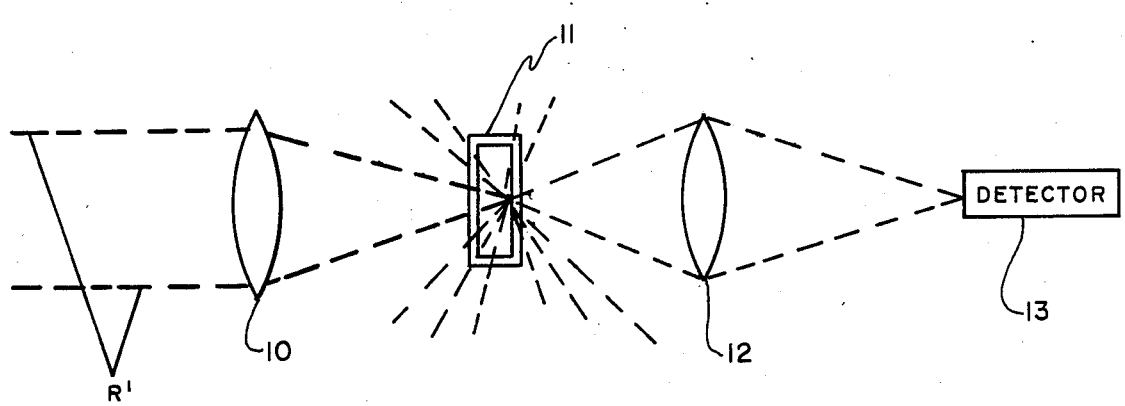
FIG. 2 shows the device of FIG. 1 in a limiting mode.

When, however, the radiation is high-intensity, as shown by R' in FIG. 2, the amount of radiation passed by 11 is limited. That radiation not passed by 11 is reflected, absorbed, scattered, or any or all of these. More on this later.

Figure 3:
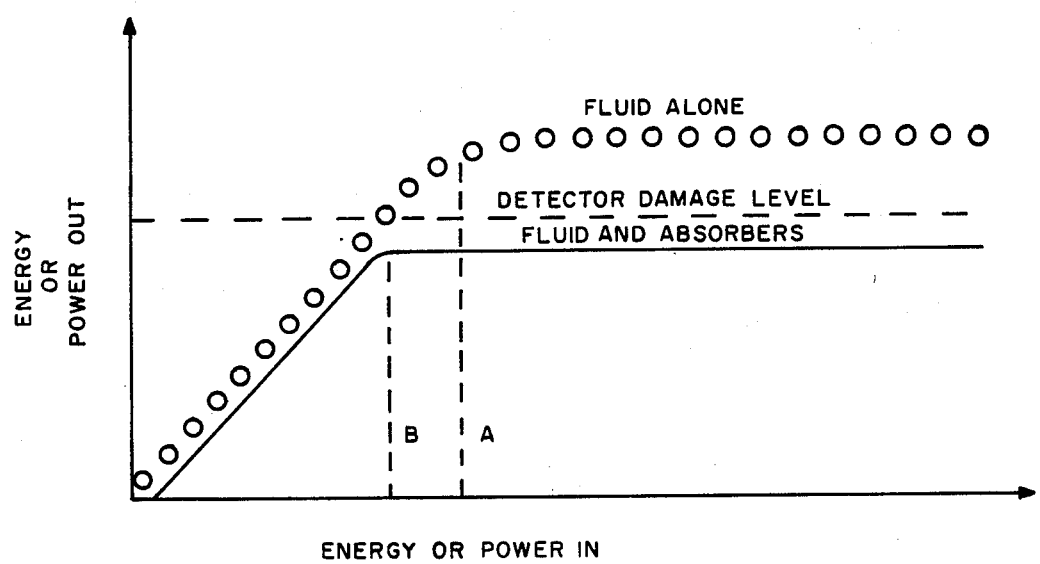
FIG. 3 shows response curves of energy or power limiters, on an arbitrary scale.

Looking now at FIG. 3, we see curves for limiting of optical energy or power by a nonlinear optical fluid with and without absorbing particles in the fluid. The small circle curve shows that the fluid alone may act as a limiter, and limits output above some input threshold A. Unfortunately, this threshold allows the output to exceed a level above the detector damage level. The solid-line curve shows limiting at an input threshold B, such that the output level is below the detector damage level.

Having thus far described our device in general, we now go on to some particulars. First, the placement of the inventive device is critical; in order to effectively operate, the device should be at a location at or near a focal plane in an optical system before the detector to be protected. Preferably, the first focal plane of the system is chosen. In the case of a simple telescope as the optical system and a human eye as the detector, this preferred location is at the focal plane of the objective lens of the telescope. The radiation passed by the objective and the eyepiece of the telescope, in a nonlinear mode of our device, has an intensity well below the eye damage threshold level.

A particular fluid which we use in our invention is methanol. The particles are carbon, such as those in India ink. The main requirements of the liquid, besides its being a nonlinear optical material for wavelengths of interest, are that it is stable and that it is able to form a stable suspension or emulsion of the particles. Polar solvents such as water, acetone, and dimethyl sulfoxide and nonpolar solvents such as n-hexane, cyclohexane, and dimethyl phthalate are all acceptable. The particles should have dimensions of about a wavelength or less of the incident radiation and, besides carbon, may be metallic blacks or other good absorbers. Whatever the material, the particles should, at least partially, act as black-body absorbers. Although, in FIG. 3, the fluid alone curve is shown slightly above the detector damage level, the curve could be orders of magnitude higher than the damage level. We realize that any fluid, if subjected to a sufficiently high intensity radiation, will act nonlinearly, but some fluids may be irreversibly damaged by such high-intensity radiation. The instant device is intended to bring the nonlinear region of a fluid down to a usable level.

As to the phenomenon by which our inventive device operates—there are probably several phenomena responsible. Obviously, the particles act as absorbers and scatterers. The particles absorbing high-intensity energy either form radiation scattering vapor bubbles around themselves, and/or become hot plasmas; such plasmas also could act as absorbing and scattering sites. Well above threshold, self-focusing may also occur in the fluid. Whatever the phenomenon, the device is self-healing after the high-intensity radiation abates.

The material from which the cell is made depends upon the wavelengths of the threat and normal scene radiations, and may be glass, quartz, sapphire, etc., and may be anti-reflection coated. For practical purposes, the fluid thickness d should be on the order of 1–10 mm. This will give a dynamic range of at least $10^3$–$10^4$. The radiation should be focused toward the side of the fluid facing the detector to maximize dynamic range.

A particular cell which we have constructed and tested consisted of a solution of filtered India ink in methanol with a quartz container, such that the attenuation of low-level radiation through the cell is 10%. For this cell we found: 1. broadband radiation response throughout the visible and near infrared spectra, 2. operation independent of incident radiation angle, 3. subnanosecond triggering, even after a very large number of pulses. We envision that our invention can be incorporated into optical systems being built or retrofitted into existing optical systems. The retrofit can be either internal or external to the existing system. The cell may be combined with other optical elements such as reticles, etc.

We claim:

1. An optical energy and/or power limiter for protecting a sensitive optical detector from high-energy or high-power optical radiation and including:
   a limiting cell containing a nonlinear optical fluid essentially transparent to optical radiation below a first energy or power threshold, and only partially transparent to said radiation above said threshold, and further containing optical radiation absorbers in the form of finely divided particles essentially uniformly distributed throughout said fluid and,
   means for focusing said radiation into said cell, whereby said cell is interposed between said means and said detector is only partially transparent to radiation above a second energy or power threshold, and wherein said second threshold is lower than first threshold.

2. The device as set forth in claim 1 wherein said particles are carbon with dimensions comparable to or less than the radiation wavelengths.

3. The device as set for the in claim 1 wherein said particles are metallic blacks with dimensions comparable to or less than the radiation wavelengths.

* * * * *